United States Patent [19]

Provost et al.

[11] Patent Number: 4,662,037
[45] Date of Patent: May 5, 1987

[54] METHOD AND APPARATUS FOR SLITTING AND PROVIDING SELVEDGE BY ULTRASONIC MEANS ON HOOK AND LOOP TYPE FASTENER TAPES

[75] Inventors: George A. Provost, Litchfield; William F. Trask, Nashua, both of N.H.; Gerald F. Rocha, Lowell, Mass.

[73] Assignee: Actief, N.V., Willemstad, Netherlands Antilles

[21] Appl. No.: 723,240

[22] Filed: Apr. 15, 1985

[51] Int. Cl.[4] ................ A44B 21/00; B32B 31/18
[52] U.S. Cl. .................................. 24/447; 24/442; 24/443; 24/DIG. 11; 156/73.3
[58] Field of Search ............... 24/442, 446, 447, 448, 24/443, 90 HA, DIG. 11, 693; 156/73.3, 73.2, 88

[56] References Cited

U.S. PATENT DOCUMENTS

| | | | |
|---|---|---|---|
| 3,114,951 | 12/1963 | Mestral | 24/447 |
| 3,464,094 | 9/1969 | Mates | 24/443 |
| 3,527,629 | 9/1970 | Wylde | 24/447 |
| 3,550,223 | 12/1970 | Erb | 24/448 |
| 3,640,786 | 2/1972 | Carpenter | 156/73.2 |
| 3,650,647 | 3/1972 | Jacobs et al. | 24/90 HA |
| 3,925,858 | 12/1975 | Thaeler | 24/DIG. 11 |
| 3,981,051 | 9/1976 | Brumlik | 24/447 |
| 4,377,427 | 3/1983 | Francois | 156/73.3 |

FOREIGN PATENT DOCUMENTS 2395127  2/1979  France .................. 156/73.3

Primary Examiner—Victor N. Sakran
Attorney, Agent, or Firm—Pennie & Edmonds

[57] ABSTRACT

An apparatus for ultrasonically providing selvedge on separable fasteners of the hook and loop-type. Portions of the separable fastener member are ultrasonically softened or melted and pressed toward the surface of the base member so as to be combined, or in some instances, consolidated therewith. The portions may be given a textured appearance by use of a textured anvil having either a simulated selvedge surface or even a trademark or logo impressed, machined or etched thereon. The tape may be provided with several selvedge portions and then slit medially of the portions to provide at least two separable fasteners of smaller width from a separable fastener of wider width.

16 Claims, 12 Drawing Figures

FIG. 1
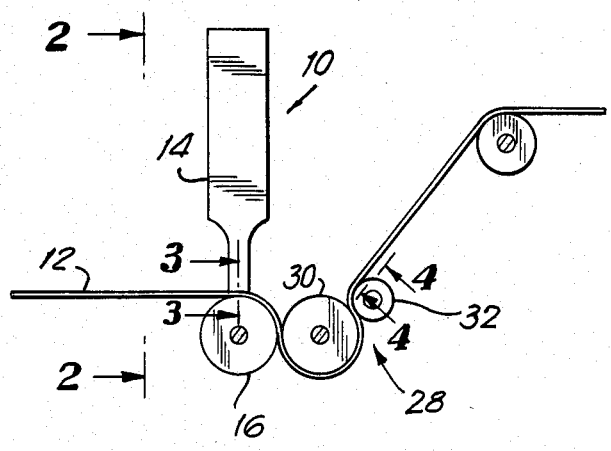
FIG. 2
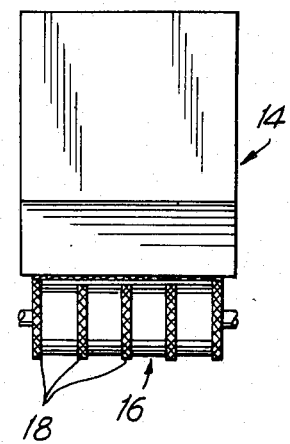
FIG. 3
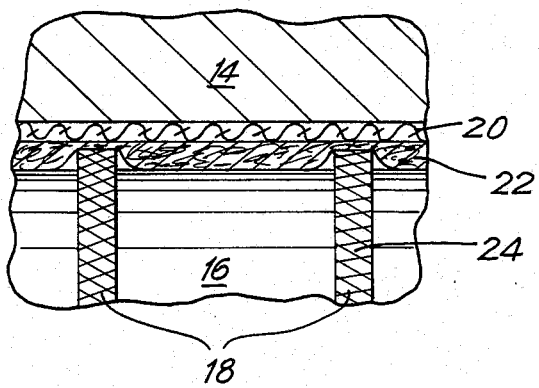
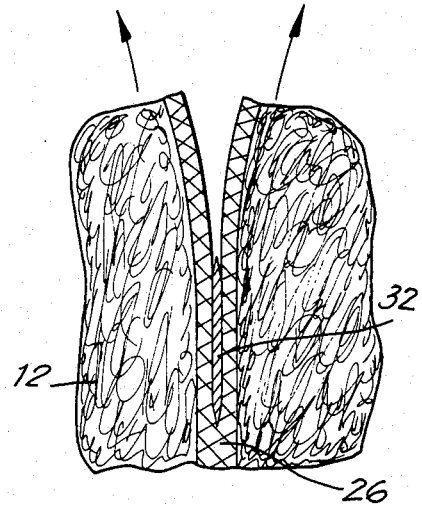
FIG. 4
FIG. 5
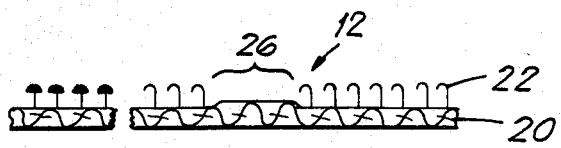

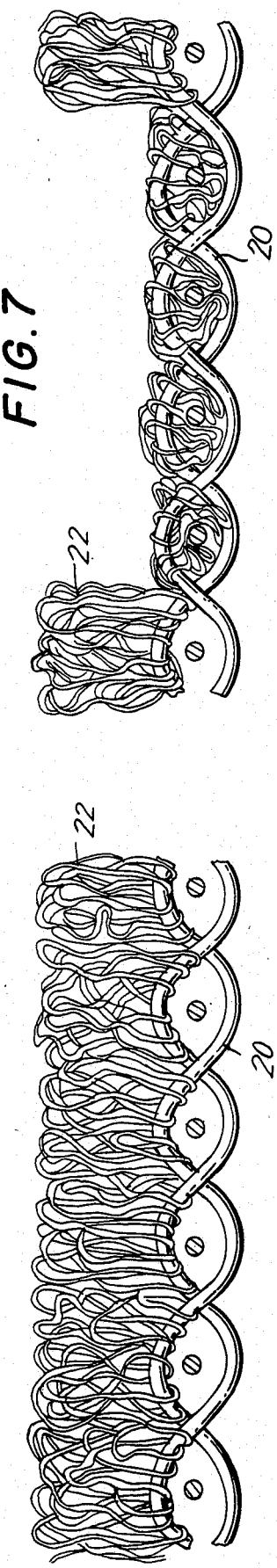
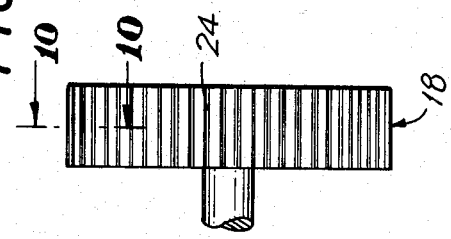
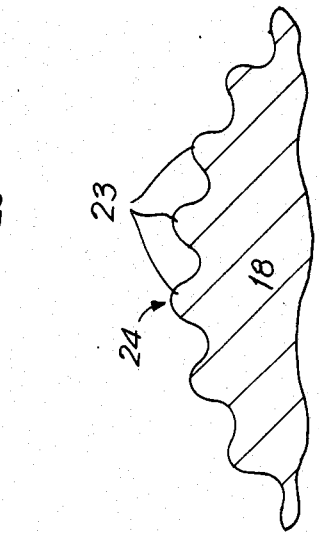
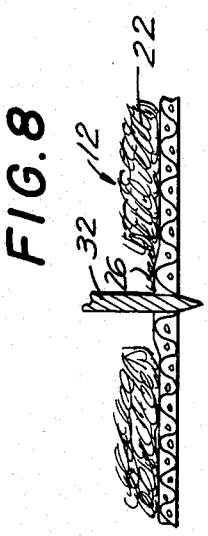
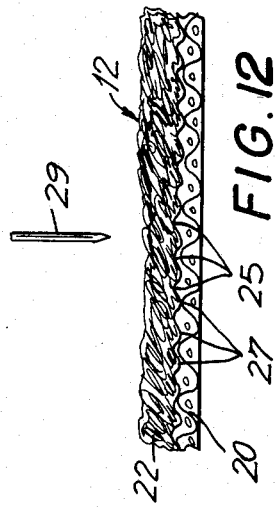
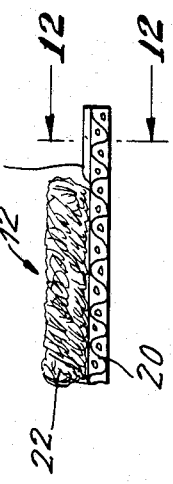

METHOD AND APPARATUS FOR SLITTING AND PROVIDING SELVEDGE BY ULTRASONIC MEANS ON HOOK AND LOOP TYPE FASTENER TAPES

BACKGROUND OF THE INVENTION

1. Field of The Invention

The invention relates to a product, method and apparatus for producing separable fasteners of the hook and loop type, and more particularly for slitting and providing selvedge by ultrasonic means on such separable fasteners.

2. Description of The Prior Art

A selvedge (selvage) is the marginal edge portion on either side of a woven or flat knitted fabric so finished as to prevent raveling. Often it is woven of different or heavier threads than the actual fabric and oftentimes in a different weave pattern. The method for providing selvedge on woven fabric in the past was to set the loom or knitting machine up to weave or knit (as the case may be) the selvedge as the fabric was being manufactured This technique was always expensive and time consuming.

In particular, in separable fastener tapes of the hook and loop-type, the prior art techniques were cumbersome in that the final width of a woven or knitted separable fastener tape had to be selected at the actual weaving or knitting stage. This necessitated a large inventory of separable fasteners of numerous widths to be on hand to suit customer(s) requirements. Moreover, as is known, the stitch pattern of weaving and knitting machines are not sufficiently exacting as to maintain the desired width of the separable fastener tape within precise predetermined limits.

We have invented an apparatus and method for slitting and providing selvedge on fastener tapes along the selvedge thus provided. Thus our invention makes it possible to, in effect, stock all widths of tapes by merely stocking a single wide width tape, and thereafter providing individual selvedge and slitting according to the widths defined by customer needs, thereby providing widths of tape held within very close dimensional tolerances through the use of our apparatus.

Our invention also relieves a second problem found in prior methods of selvedging textile materials. The prior art methods produced a tape with a knitted or woven selvedge, but the tape would actually fluctuate in width along its length. This is caused by the unevenness of weaves or knits and small knots (or discontinuities) in the yarn or stitches. The present invention allows the tape width to be maintained within very small tolerances. This is possible because the selvedges and width are determined without the constraint of the knit or weave pattern.

The invention permits the quick production of narrow width tapes from a stock of broader width tapes. It also provides a continuous selvedge on the cut edges.

SUMMARY OF THE INVENTION

The invention relates to an apparatus for continuously providing at least one selvedge portion of indefinite length on a fastener member of the hook and loop type, the fastener member or members being formed of ultrasonically deformable material, comprising at least one horn and at least one ultrasonic anvil positioned for movably supporting the fastener member therebetween while pressure is applied to at least a portion of the fastener member by said horn and anvil.

The apparatus may be comprised of an ultrasonic horn for imparting ultrasonic energy and at least one anvil having at least one raised land for supporting engagement with the fastening side of a fastener member. The ultrasonic horn is selectively adjustably movable toward and away from the anvil so as to selectively provide ultrasonic energy and pressure to the fastener member in order to provide a surface portion having an appearance which differs from an adjacent surface portion.

The anvil may have an arcuate configuration and may be adapted for rotation. The anvil may be comprised of a plurality of arcuately configured raised lands. The arcuate shape contemplated may be a cylindrical outer surface on the lands so they may maintain continuous face-to-face contact with the fastening side of the separate fastener.

The separable fasteners may be of the type having a base with a plurality of hook and loop-type engaging elements upstanding from a surface thereof. In one embodiment the raised land is given a textured surface such that it imparts a textured surface appearance to the selvedge portion. This texture may be such as to give the selvedge portion the appearance of knitted or woven selvedge portion.

Once a selvedge portion has been formed at a position across the width of a separable fastener, the selvedge may be slit medially to provide two or more separate fasteners of narrower width from a single separable fastener. The slitting may be provided by a rotary cutting blade, and the cutting blade may function while circumferentially contacting a rotating base cylinder which positions and supports the separable fastener.

The apparatus merely softens and flattens the hooking elements such that once they cool they permanently assume their flattened orientation and, because of the texture on the land of the anvil, they assume their textured appearance, similar to a woven, knitted or patterned selvedge, depending upon the textured surface selected.

The invention also relates to the method of continuously providing selvedge on separable fasteners of hook and loop-type having a base member and a plurality of upstanding engaging elements which are made of ultrasonically deformable material comprising steps of ultrasonically softening a portion of the engaging elements at predetermined locations and simultaneously providing pressure to flatten the softened elements such that once they reharden they become combined with the base member to provide the selvedge portion. A further step of slitting the seperable fasteners at a point generally medial of the flattened portion is also described. This provides for a plurality of separable fastener tapes of lesser width with selvedges formed thereon from a single tape of wider width. The selvedges on the tapes of lesser width have a width less than the initially formed selvedges.

The product of the invention is a hook and loop type fastener member having a base member and a plurality of engaging elements upstanding from the base member and at least one selvedge portion comprised of a portion of engaging elements ultrasonically combined in a composite form with the base member to which said engaging elements are connected. The selvedge may vary in thickness along the length of the member so as to produce selvedge portions of differing hardness. The thickness may differ by varying in a wavy pattern, alternating between thicker, softer portions and thinner, harder portions. The engaging elements may be in the form of hooks, loops, or even mushroom-shaped hook-type engaging elements formed by melting the top of upstanding members.

BRIEF DESCRIPTION OF THE DRAWINGS

Preferred embodiments of the invention will be described hereinbelow with reference to the drawings wherein:

FIG. 1 is an elevational view of one embodiment of the apparatus of the invention;

FIG. 2 is a view of the apparatus taken along line 2—2 of FIG. 1;

FIG. 3 is an enlarged partial cross sectional view of the apparatus of the invention taken along line 3—3 of FIG. 1;

FIG. 4 is a partial cross sectional view of the slitting device of the invention taken along line 4—4 of FIG. 1;

FIG. 5 is a cross sectional view of woven hook-type separable fastener tape after ultrasonic fusing but prior to slitting; mushroom-type hooking elements are also shown for illustration;

FIG. 6 is an enlarged cross-sectional view of a loop-type separable fastener prior to selvedging;

FIG. 7 is a view of the separable fastener of FIG. 6 with selvedge portion provided by the method and apparatus of the invention;

FIG. 8 is a cross-sectional view of a separable fastener being slit along the selvedge portion;

FIG. 9 is an alternate embodiment of the raised land of the invention;

FIG. 10 is a view along line 10—10 of FIG. 9;

FIG. 11 is a partial cross-sectional view of a separable fastener with selvedge produced by the land of FIG. 9; and FIG. 12 is a view taken along line 12—12 of FIG. 11.

DESCRIPTION OF THE PREFERRED EMBODIMENT

Referring initially to FIG. 1 there is shown the ultrasonic selvedge apparatus 10 which performs the actual fusing of the fastener tapes by ultrasonic energy to provide the selvedge. The ultrasonic selvedge apparatus 10 includes ultrasonic horn 14 and rotary anvil 16. As shown in FIG. 2, the ultrasonic horn 14 has a width greater than the width of the rotary anvil 16 as well as the width of the separable fastener tape 12 as measured in a direction transverse to the direction of tape movement. For example, in one embodiment the anvil and tape are approximately 4 inches in width and the ultrasonic horn is approximately 4½ inches wide. Generally, however, the separable fastener tape has a predetermined width and thickness and is of indefinite length.

The rotary anvil 16 includes a cylindrical drum 16 as shown, having a plurality of raised lands 18. As is apparent, the number and location of the raised lands 18 is determined by the number, spacing and location of the fused selvedge areas which may be required with a given width of tape. As can be seen in FIG. 2, this embodiment has five lands 18, equally spaced in the longitudinal direction, on the rotary anvil 16. However, any number of lands may be included. The configuration shown will produce four equal width narrower tapes from a single wide tape 12.

Referring now to FIG. 3 in conjunction with FIG. 2, the lands protrude radially from the anvil body. The minimum distance which the lands extend radially outward above the cylindrical portion of the anvil between the lands is normally determined by the material which is being provided with selvedges. Such factors as material thickness (including the base thickness plus the engaging elements) and material's ultrasonic compatibility are also considered in determining the land dimensions. As a general rule, the lands 18 should extend outwardly of the drum, a distance which allows the hooking elements of the woven or knitted tape in the area between the lands to pass through the selvedge apparatus without interference. This distance is approximately 75% of the total thickness of the separable fastener including both the base member and the upstanding engaging elements.

The width of the lands, that is the dimension taken at the radially outermost location in a direction parallel to the longitudinal axis of the anvil, will determine the width of the selvedge area. This width depends upon the desired selvedge width. Where the selvedge is to be slit as will be described hereinbelow, the width of the selvedge will be approximately twice the desired selvedge width required for the final strip of tape. For example, on a tape approximately one-inch wide, the selvedge will generally be from approximately 1/32 to approximately 3/16 inch. In the embodiment shown in FIG. 2, five raised lands 18 are shown. Each land is approximately ⅛ inch wide and has approximately ⅞ inch of cylindrical anvil portion 19 with reduced diameter therebetween. When the selvedge portions 26 are slit, as shown in FIG. 4, along the length of the tape 12, the anvil configuration shown produces four tapes of 1-inch width with an effective fastening width of about ⅞ inch from an original 4-inch wide tape. It is apparent, however, that a variety of raised lands, positions, dimensions or the like may be used to produce tapes in a variety of widths.

The operation of the ultrasonic selvedge apparatus is as follows. The separable fastener tape 12 is drawn through the ultrasonic selvedge apparatus by driving means (not shown) driving the rotary anvil 16. The tape 12 is pulled through the narrow pre-set separation between the ultrasonic horn 14 and the raised lands 18 of the rotary anvil 16, as shown in FIGS. 1, 2 and 3. This gap is slightly greater than the thickness of the woven base portion 20 of the separable fastener tape 12, as shown in FIG. 3.

As can be seen further in FIG. 3, the tape is moved through the ultrasonic selvedge apparatus in a face-down orientation, that is, the side of the tape having the plurality of hooking elements 22 (i.e., hook type or loop type) upstanding therefrom is facing the rotary anvil 16. As the tape 12 moves through the apparatus 10, the raised lands 18 of rotary anvil 16 compress the hooking elements 22 against the face of the woven base 20 of the tape 12. The ultrasonic horn 14 provides ultrasonic energy to the tape 12 in the area of the raised lands 18. This energy, combined with the applied pressure, then effectively flattens and fuses the hooking element portion 22 of the tape 12 in these areas 26. The fused material melts or softens and combines, either substantially or completely, with the base fabric and serves to firmly join the woven fibers such that on subseguent cutting they will not separate or ravel. FIG. 5 shows the tape 12 in partial cross section showing the selvedge area 26. As is seen, the selvedge portion is thicker than the surrounding base member. In FIGS. 6 and 7 the separable fastener is shown before and after selvedging. The selvedge portion 26 is created by the loop-type engaging elements, softening and forming a composite with the woven base.

In order to provide the appearance of a woven selvedge, the outermost surfaces 24 of the raised lands 18 are textured either by etching, impressing, machining or otherwise, about the circumference. Any roughened or textured appearance, or even a trademark or logo, may be used depending upon the final selvedge texture desired. In any event, by "textured" we mean the provision of a surface on the land which is uniformly or nonuniformly roughened—as by a weave appearance—or designed—as by a logo—either by etching, machining, or otherwise, to provide a similar impression on the flattened selvedge portion of the fastener tape. If desirable, the land may also be smooth. In one embodiment the selvedge surface is a series of opposed diagonal lines producing a diamond shaped pattern. The roughened or textured appearance eliminates the "ultrasound" appearance of the fabric which is sometimes glossy. At the same time, the roughened surface provides the appearance of a woven selvedge.

One significant advantage of the present invention is as follows. If the selvedged product is to be attached to another article by sewing in a further manufacturing process, the raised lands 18 may be provided with circumferential spaced raised ribs, either extruded or machined, as shown in FIGS. 9 and 10. These raised ribs provide selvedge portions of the product base which appear as a weave and are alternating ribs of greater and lesser thickness as shown in FIG. 12. This ribbed selvedge configuration facilitates passing a sewing needle through the selvedge portion during a subsequent sewing process. The ribs which run axially of the land, may be in the form of smooth waves, as in FIG. 10, or square teeth (not shown). The embodiment of FIGS. 9 and 10 has wavy teeth 23 such that the selvedge produced is a series of crests 25 and troughs 27 as shown in FIG. 12. The selvedge is thus alternately more and less compact and therefore harder in the area of the troughs 27 as compared to the softer, less compact portions of the crests 25.

The alternation between soft portions and hard portions facilitates sewing the tape with relative ease. For example, the more compact selvedge portions (i.e. valleys) are harder and stronger than the crests. However, if the entire selvedge is uniformly hard, the base of the fastener member may break the sewing needle 29 shown in FIG. 12. Also, if the needle 29 does penetrate such hard selvedge, the base may crack or split. The soft "crest" portions provide the necessary "give" so that when the needle 29 is forced through the hard portion, the base will allow the needle's penetrations without cracking. If the needle 29 does penetrate a soft portion, the surrounding harder portions give the soft portion added strength.

Any design such as a manufacturer's trademark or logo may be machined or etched into the anvil. The trademark would thereby be permanently formed into the selvedge.

The ultrasonic horn is subject to abrasion as the woven tape material 12 moves along its bottom face. In order to reduce the wear caused by this abrasive action, the horn 14 is provided with a special carbide tip, which has been formed to resist wear over numerous cycles of use.

As is apparent, the characteristics of the resultant narrow tape may be easily changed merely by changing the configuration or characteristics of the raised lands 18. For example, a wider land will produce a wider fused selvedge area. In addition, the number of lands, and the location and spacing of lands may be altered to provide different resultant widths. The wide tape need not be subdivided into narrow tapes of equal width but may be subdivided into narrow tapes of different widths. For example, a 4-inch tape may be subdivided into two 2-inch tapes, four 1-inch tapes or one 2-inch tape and two 1-inch tapes. The various combinations which are possible with the instant invention are legion.

When the tapes are to be slit along the selvedge area 26, the lands will be twice the width of the desired final selvedge. The reason for this requirement is that the slit can be made to extend down the center of the fused "selvedge" area so as to provide a selvedge of desired width on the edge of both of the pieces produced. Accordingly, after passing through the ultrasonic selvedge apparatus 10, the wide tape has a series of fused portions 26 spaced across the tape width which run its length where the hooking elements have been fused into the tape, as shown in FIG. 5.

The preferred embodiment of the invention includes a cutting apparatus which slits the tape along the selvedge area. The cutting apparatus 28 comprises a base cylinder 30 and rotary cutting blades 32, shown in FIGS. 1 and 4. The base cylinder is driven by driving means (not shown) which can be the same drive means which drives the rotary anvil 16. The blades 32 (one shown) are mounted to rotate freely but, alternatively, they may be driven. These blades thus rotate and come in circumferential contact with the base cylinder 30. The blades 32 are positioned such that they slit the fastener tape 12 along its length at positions across its width substantially centered in the fused selvedge portions providing clean, fray resistant edges.

The cutting operation is as follows. The separable fastener tape 12 is drawn through the nip of the rotary anvil 16 and the base cylinder 30. The tape then partially wraps around the base circumference of base cylinder 30. The tape 12 is positioned such that the base fabric (i.e., the side opposite the side having the plurality of hooking elements upstanding therefrom) is in contact with the circumferential face of the base cylinder 30. This provides a firm cutting surface and enhances accuracy of the cutting blades when cutting takes place. The tape 12 then passes between the base cylinder 30 and the cutting blades 32. The blades slit the tape as shown in FIG. 4.

The tape 12 is now divided into a plurality of tapes of narrower width. Each tape has a selvedge already provided by the ultrasonic deforming and fusing of the hooking members. From this point the tape continues on to be either rolled up, cut to individual lengths or used in a further process; optionally, cutting can be carried out on a separate cutter if desired.

Thus it can be seen that from entry of the tape into apparatus 10 and exit of a plurality of final tapes, each of lesser width than the initial tape, the selvedge and slitting operation is entirely automatic. Thus, a single roll of wide width tape may be introduced into the apparatus with several rolls of tapes of lesser width than the original roll exiting the apparatus. Optionally, automatic roll devices may be used in conjunction with the apparatus to simultaneously package the finished narrow tapes.

A significant advantage of the invention is that by stocking wide width tapes, a manufacturer or supplier will be in a position to fill various customer needs for tapes of lesser thickness than the available tape. Furthermore, since the slitting knives are capable of accurate positioning with respect to each other, slitting on the instant apparatus can be accomplished within thousandths of an inch, a tolerance which woven or knitted selvedge tapes are incapable of meeting.

Although the invention has been described by way of a limited number of examples, it will be apparent to those skilled in the art that the foregoing was merely representative. In order to appreciate fully the invention, reference should be made to the appended claims.

We claim:

1. A hook and loop-type fastener member having an elongated base member and a plurality of engaging elements upstanding from said base member, and a plurality of selvedge portions along the length of said base member comprised of a portion of engaging elements substantially ultrasonically combined with the base member to which said engaging elements are connected such that on subsequent cutting they will not ravel.

2. A hook and loop-type fastener member according to claim 1 wherein said engaging elements are loops.

3. A hook and loop-type fastener member according to claim 1 wherein said engaging elements are hooks.

4. A hook and loop-type fastener member according to claim 1 wherein said engaging elements are mushroom-like hooking elements.

5. A hook and loop-type fastener member having an elongated base member and a plurality of engaging elements upstanding from said base member, and a plurality of selvedge portions along the length of said base member wherein the engaging elements have been softened and fused into the base, said selvedge portions varying in thickness along the length of the tape so as to produce alternating selvedge portions of differing thickness and hardness.

6. A hook and loop-type fastener member according to claim 5 wherein the thickness varies in a wavy pattern alternating between thicker, softer portions and thinner, harder portions.

7. The fastener tape according to claim 2 wherein the thickness varies in a wavy pattern alternating between thicker, softer portions and thinner, harder portions.

8. The fastener tape according to claim 2 wherein said selvedge portion is textured with a predetermined appearance.

9. The fastener tape according to claim 2 wherein said selvedge portion is textured with a predetermined logo.

10. A hook and loop-type fastener tape comprising an elongated base member formed of woven fibers and a plurality of engaging elements upstanding from said woven base member, and a plurality of selvedge portions along the length of said tape, each said selvedge portion formed of a portion of engaging elements substantially ultrasonically combined with the woven base member to which said engaging elements are connected so as to firmly join the woven fibers such that on subsequent cutting they will not ravel.

11. The fastener tape according to claim 10 wherein said engaging elements are loops.

12. The fastener tape according to claim 10 wherein said engaging elements are hooks.

13. The fastener tape according to claim 10 wherein said selvedge portions are textured.

14. A hook and loop-type fastener tape comprising an elongated base member formed of woven fibers and a plurality of engaging elements upstanding from said woven base member, and a plurality of selvedge portions along the lengths of said tape wherein the engaging elements have been softened and fused into the woven base, so as to firmly join the woven fibers to preclude ravelling on subsequent cutting, said selvedge portion varying in thickness along the length of the tape so as to produce alternating selvedge portions of differing heights and hardness.

15. The fasterner tape according to claim 14 wherein the thickness varies in a wavy pattern alternating between thicker, softer portions and thinner, harder portions.

16. The fastener tape according to claim 14 wherein said selvedge portion is textured with a predetermined appearance.

* * * * *